April 23, 1963   J. G. BAYLY   3,087,143
TIME DELAY DEVICE FOR ANALOGUE COMPUTER
Filed Jan. 26, 1959   6 Sheets-Sheet 2

Inventor
John G. Bayly
By Stevens, Davis, Miller & Mosher
Attorneys

April 23, 1963   J. G. BAYLY   3,087,143
TIME DELAY DEVICE FOR ANALOGUE COMPUTER
Filed Jan. 26, 1959   6 Sheets-Sheet 3

Fig 5

Inventor
John G. Bayly
By Stevens, Davis, Miller & Mosher
Attorneys

Fig 6

April 23, 1963 J. G. BAYLY 3,087,143
TIME DELAY DEVICE FOR ANALOGUE COMPUTER
Filed Jan. 26, 1959 6 Sheets-Sheet 5

Inventor
John G. Bayly
By Stevens, Davis, Miller & Mosher
Attorneys

Fig.9

United States Patent Office 3,087,143
Patented Apr. 23, 1963

3,087,143
TIME DELAY DEVICE FOR ANALOGUE
COMPUTER
John Goodenough Bayly, Deep River, Ontario, Canada,
assignor to Atomic Energy of Canada Limited, Ottawa,
Ontario, Canada, a corporation
Filed Jan. 26, 1959, Ser. No. 789,033
9 Claims. (Cl. 340—173)

This invention relates to apparatus for delaying an electrical function for a definite variable period of time and is particularly concerned with a time delay mechanism for use in conjunction with analogue computers for simulating the time delays occurring in a physical process.

The need for accurate reliable means for delaying an electrical function for a known period of time is an acute one, in all spheres of activity in the electronics field, but is particularly acute in the analogue computer art where, in the electrical simulation of physical processes, it is frequently necessary to simulate in the electrical computing process a delay corresponding to an actual physical delay which occurs in the process being simulated. Examples of this would be in a nuclear reactor where an increase in power demand will temporarily lower the temperature of the moderator flowing through a heat exhanger, and the delay while the cooler moderator flows back to the reactor core may significantly modify the reactor's control characteristics. Again in automotive problems the behaviour of a suspension system may depend upon the time interval between the impacts made at the front and rear wheels. Yet another example occurs in chemical control work where it is frequently necessary to simulate the delay between a change in flow rate of a reagent and the effect of this change on the product.

In certain other fields, as for example, in generating auto-and-cross-correlation functions fixed or manually adjustable delays may be adequate. In most physical processes however, the delay time is the ratio of a transport distance to a transport velocity, and one or both of these may be variable.

Two basically different techniques are being used for simulating delays. The first is the transfer function method, in which a circuit is used which has approximately the same transfer function as the true physical delay. In other words, a study is made of the actual physical process to determine the nature of the physical function prior to delay and then of its modified form after delay and thus the physical transfer function, which may be defined as the ratio of the output to the input, is determined. A circuit having a similar transfer function is then devised, using D.C. amplifiers and RC networks. Then an input electrical function or forcing function corresponding to the physical input is then processed by the circuit so that an electrical output is obtained corresponding to the output of the physical process.

The second method in common use is the electro-mechanical method where the electrical function corresponding to the physical function is stored for the prescribed period of time and is then read out after the required delay has elapsed.

The transfer function method whilst capable of giving valuable results for specific applications is unsuitable in many cases because of the difficulty in making the simulated delay vary in response to a voltage representing the velocity. Indeed since the transfer function method is only valid for a specific combination of circumstances it can only be used to simulate one specific physical process and so the transfer function method cannot apply when the delay is variable. Furthermore even for fixed delays the approximations necessarily involved in this type of circuit result in a violent transient ringing when the system is called upon to delay a step voltage. A further drawback of the transfer function approach is that the cost of the equipment is high since each delay requires between three and nine amplifiers.

For more detailed discussion of transfer function circuits for simulating transport delay reference may be had to Report WAPD–T–38 by G. S. Stubbs and C. H. Single published by the Westinghouse Electric Corporation Atomic Power Division.

The electro-mechanical approach to the problem of storage is more suitable because by this means it is possible to more closely approximate in physical terms an analogue of the actual delay occurring in the physical process. Perhaps the most obvious example of this is the system utilizing a magnetic storage mechanism such as a magnetic drum or magnetic tape on which are stored pulses whose intervals are determined by an input D.C. voltage corresponding to the function to be delayed, such pulses being readily obtained from a conventional electronic multiplier. This method has been explored amongst others by H. B. Belck and reference may be had to his paper on this subject entitled "The Application of a Magnetic Tape Recorder in Analogus Computing" presented at the Project Typhoon Symposium III in October, 1953 at the Naval Air Development Centre, Johnsville, Pa.

However, for this magnetic memory approach an appreciable amount of capital expenditure is required to build the equipment with the cost in many cases being prohibitively high. Also the problem of control presents several difficulties.

There remains one other electro-mechanical approach to the problem which has the virtue of comparatively low capital cost whilst retaining simplicity of control. This is the system employing the facility of a condenser to store a given charge donated to it for any predetermined period of time and then in turn to donate this charge to a suitable acceptor at the termination of this period.

Two approaches made along this line by other researchers in this field are worthy of mention. The first of these is the so-called "Bucket Brigade" scheme in which the input voltage charges a first condenser. The charge on this condenser is then passed or "dumped" to a second condenser and from this into a third and so on. This method which has been described by J. M. L. Jannssen in an article published in Nature at page 148 of volume 169, in January 1952 and entitled "Discontinuous Low-Frequency Delay Line With Continuously Variable Delay" and also by G. A. Philbrick in "Palimpset on the Electronic Analogue" at page 163 entitled "Bucket Brigade Time Delay," and is chiefly attractive in that the velocity being simulated can be the control for the rate at which the charges are moved along the condenser chain. Hence the total delay, and also the length of the chain, i.e. the total number of condensers involved, can be changed easily so as to simulate the transport distance and also this means that a given amount of equipment be used to provide one long or several shorter delays.

The big drawback to this system is that it requires separate amplifiers for each condenser and also that it is intrinsically suspect to error due to the incomplete transfer of charge from one condenser to the next.

A better approach to the condenser storage method is that in which the input voltage is applied to each of the condensers in sequence. Each condenser then holds its given charge for the prescribed period of time until the charge is read out again. Thus by sampling a given electrical function at specific time intervals and applying an input voltage to a plurality of condensers in sequence corresponding to the sampled voltage it is possible to store in a chain of condensers a large number of individual voltages which in the aggregate represent any given electrical function. If after a prescribed period of time the charges on each condenser are read out in turn, then the electrical function stored therein will be reproduced in practically unmodified form except for having been delayed the required period of time.

R. A. Dandl and R. S. Stone in their article entitled "Synchronized Delay Line," published in the Semi-Annual Progress Report of the Instrumentation and Control Division of the Oak Ridge National Laboratory published May 19, 1955 describe a system in which a large number of condensers are mounted on a wheel.

Contact is made to each condenser in turn by means of a rotating brush or a rotary switch. One brush is used for the writing operation in which the charge is donated to each condenser in turn and a second brush is used for the reading operation in which the charge on each condenser is read out and passed to an output circuit.

One of the principal disadvantages of the wheel method is that it is relatively difficult to simulate changes in velocity. It is true that the shaft rotating the brushes could be coupled to a velocity servo and thus the system would be rendered more flexible but there still remains the problem of the definite moment of inertia of the wheel which means that when it is required to speed up the wheel, i.e. increase the velocity there must always be a finite period of time whilst this change in velocity is being accomplished, i.e. there is a finite acceleration, and similarly the momentum of the wheel prevents an instantaneous slowing down of the wheel for a reduction in velocity so that there is a similar finite deceleration period.

Another major disadvantage is that the maximum number of condensers in any chain is fixed by the number of commutator segments than can usefully be arranged on the wheel. Two or more delays can be obtained in one wheel if enough adjustable brushes are provided but then the problem arises that any change in the wheel velocity affects all the delays in a similar manner. Though this property could on occasion be a desirable one it nevertheless imposes a restriction on the flexibility of the system.

Accordingly, it is an object of the present invention to provide a time delay mechanism which whilst utilizing the property of a condenser to accept a charge and retain it for a given period of time and then donate it to a suitable acceptor circuit does so in a manner which enables any change in velocity to be made almost instantaneously, and without the necessity of having a separate amplifier associated with each condenser. The assembly thus produced is compact, of relatively low cost, and has proven highly reliable in operation.

A time delay device formed according to the present invention comprises a source of electric power, a plurality of relay units connected to said source of power, each such relay unit comprising an electric relay and at least one relay switch connected in series therewith whereby to control the energization state of said relay unit; relay switch controlling means operatively connected to each of said relay units in such a manner as to place all except one of said plurality of relay units in a common energization state; operating means operatively linked to said relay switch controlling means and thereby operable, in a predetermined period of time defined as a switching cycle, to make unique and exhaustive selection of said one relay unit from said plurality of relay units in a predetermined sequence; said operating means including means for the automatic repetition of said switching cycle; a plurality of condenser units; a donor circuit connected to each condenser unit and arranged to donate information thereto in the form of an electrical charging voltage; an acceptor circuit separately connected to each condenser unit and arranged to accept information therefrom in the form of an electrical discharging voltage; each of said condenser units comprising an electric condenser, a first switch connecting said condenser to said donor circuit and a second switch connecting said condenser to said acceptor circuit; each of said condenser switches being operatively linked with, and thereby controlled by the energization state of a respective one of said relay units whereby sequential operation of said relay units in a switching cycle is effective to cause every condenser of said condenser units to be connected in a predetermined sequence to said donor circuit and thereafter in the same sequence to said acceptor circuit.

This and other objects in the present invention will become more apparent from a study of the following description taken in conjunction with the accompanying drawings in which:

FIGURE 8a showing the voltage applied to the input relay.

FIGURE 8b showing the output pulses of this input relay.

FIGURE 8c showing the output pulses of the complete switching unit, and

Figure 1:
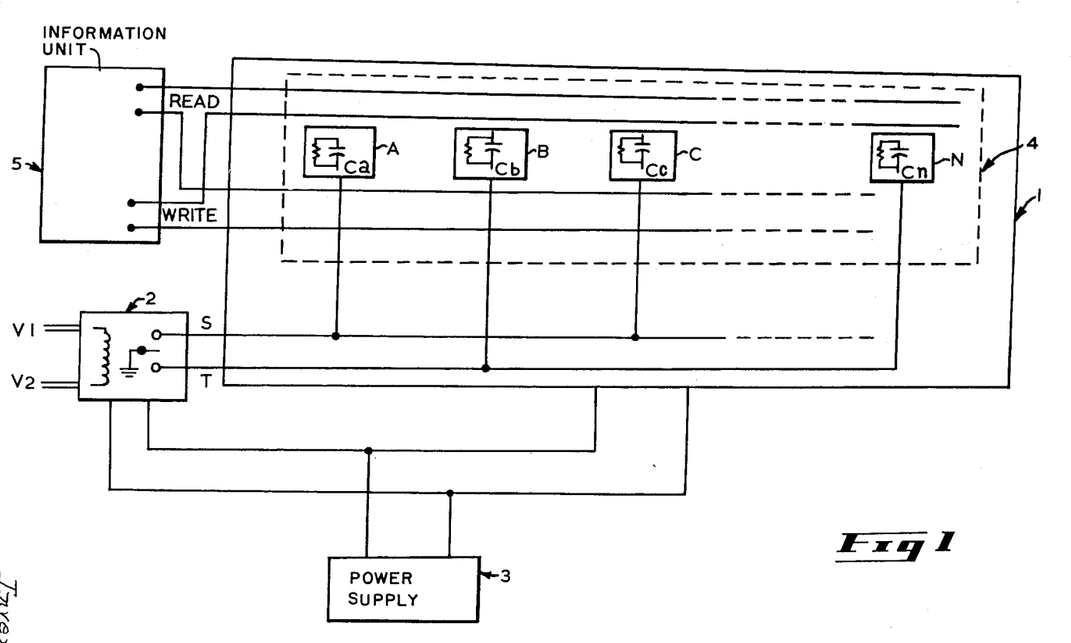
FIGURE 1 is a block diagram of the system showing the principal units and the manner in which they are interconnected.

The major units of the time delay device used in the preferred embodiment are shown in FIGURE 1. Unit 1 comprises a series of relay units A, B, C . . . N, etc. which are caused to operate in a manner to be described later by the cyclic alternate grounding of a pair of control lines S and T, the rate at which the grounding sequence is carried out being controlled by the relay switch operating unit 2.

The operating unit 2 can vary its switching speed in response to variations in either of two applied potentials V1 or V2 which may thus usefully be employed to simulate the transport velocity and transport distance associated with the physical process being simulated. Units 1 and 2 have their relays and other electronic circuitry powered from the power supply unit 3 in a perfectly conventional manner.

Associated with respective ones of each of the relay units A, B, C . . . N, etc. of unit 1 is a condenser unit $C_a$, $C_b$, $C_c$ . . . $C_n$ etc., these condenser units being housed in unit 4. Unit 4 may in practice be integrated with relay unit 1, as shown in FIGURE 1.

Each of the condenser units of unit 4 includes switch contacts to be hereinafter described, operatively linked with the particular relay unit associated with the condenser unit, by means of which it may be connected firstly to a writing or donor circuit from which an electrical voltage charge is given to the condenser, then after the appropriate delay this voltage is donated to a reading or acceptor circuit. The residual charge on the condenser is erased, preferably as shown by short circuiting the condenser through a resistor after which the writing operation may be repeated.

The electrical voltage charge impressed on each condenser in turn is derived from an information unit 5 whose output is connected to the writing circuit so that the particular electrical function appearing at any instant in the information unit 5 is impressed on the writing circuit in the form of an electrcal charging voltage. This unit 5 also includes a reading circuit which after the appropriate delay accepts the stored information back from the condenser chain in the form of an electrical discharging voltage and applies it as required in the electrical computation. As stated above information unit 5 may usefully be part of an analog computer which includes suitable circuitry for translating a particular physical process into an electrical function which is then applied to the writing circuit and after the desired delay extracted by means of the reading circuit.

The basic requirement of the unit 1 is that, of the relay units of which it is comprised, all except one should be in a common energisation state, either energised or de-energised, with the remaining one being in the opposite state to the others. Some means must then be provided whereby this one relay unit can be selected uniquely from the relay units forming part of unit 1 until the selection is exhausted, i.e. until all the relay units have been so selected, this operation occupying a finite controllable period of time which may be conveniently defined as a switching cycle. Provision must also be made so that the cycle once completed may be automatically repeated as often as required to accommodate the particular electrical function being delayed and reproduced.

Since changing the energisation state of each relay unit involves its connection and disconnection to and from a source of power, each relay unit comprises an electric relay and at least one relay switch connected in series with the relay and the source of power, this switch thus controlling the energisation state of its relay unit. Some relay switch controlling means must then be provided so that, as stated above, all except one of the switches are in a common position, either closed or open, the one switch being in the opposite position. When this has been done provision must be made for some operating mechanism or means, operatively linked with the relay switch control, which can be operated to cause the above selection process to take place until every relay unit has been selecetd when the switching cycle can repeat itself.

Figure 2:
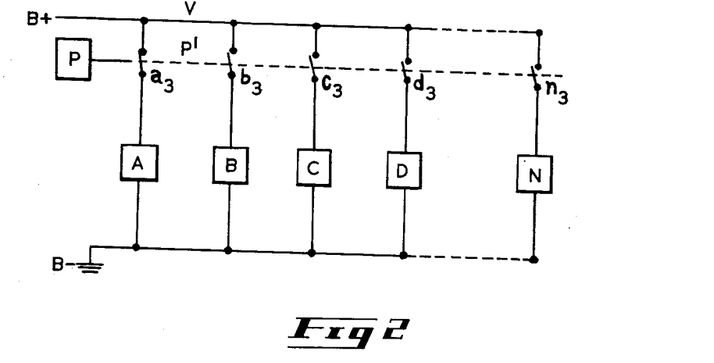
FIGURE 2 shows in schematic form the circuitry associated with a simple version the sequentially operated relay chain of the present invention.

A simple circuit for accomplishing these results is shown in FIGURE 2. Here are shown a number of relay units A, B, C, . . . N, etc. each of which incorporates a relay switch $a_3$, $b_3$, $c_3$ . . . $n_3$, etc. which when closed will connect the relay to the B+ power lead. One switch, here shown as contacts $a_3$ for relay unit A, is closed, all the others are open so that relay unit A is energised and the other relay units are de-energised.

Equally well however relay unit A could be de-energised by leaving $a_3$ open, and the other relay units would than have to be energised by the closure of their associated relay switches. The requirement is that one relay unit be in a different energisation state from the others. Also the B− line is shown here grounded but it could with equal facility be left ungrounded, and this would then permit the B+ to be grounded. The principal requirement is that the relay can be connected to a source of power and energised thereby, and of course this source of power is most conveniently a bipolar one.

The relay switch controling means is shown here symbolically as a dotted line P′, which may for example be a shaft with a number of cams on it, one for each switch, only one of which is operative in any one position of the shaft. Alternatively line P′ together with the switch contacts could be symbolic of a stepping switch of the type used in the dial telephone art where a contact arm advances one step at a time to close the contacts in sequence.

The operating mechanism linked with the relay switch control is shown here as a block unit P, which in the examples given above could be a motor to drive the cam shaft, or the step advance drive for the stepping switch. As the unit P operates it will, by means of the relay switch control, cause each relay in turn to be connected to the B+ line; repetition of the switching cycle being simply achieved by continuing the operation of the operating mechanism P.

Figure 3:
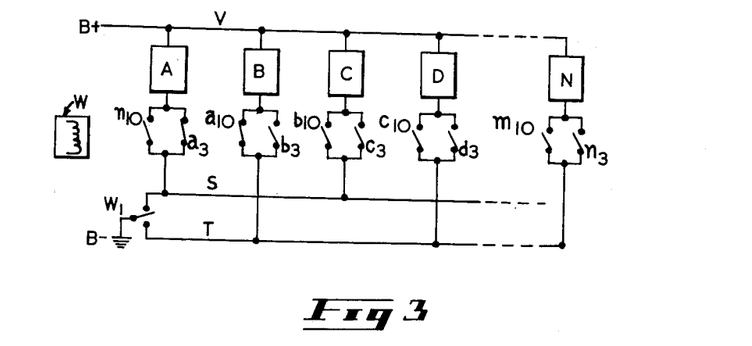
FIGURE 3 shows a more complex sequentially operated self advancing relay chain.

The above relay advancing system does not permit the flexibility of control desired, also it involved some mechanical inertia and is unsuitable for high speed operation. A circuit which overcomes some of these difficulties is shown in FIGURE 3, this circuit being of the self advancing type, where energisation of one relay unit also prepares the subsequent relay unit for energization, though the actual energisation must still be initiated by an operating mechanism. Thus in the present instance the relay units themselves to some extent may be considered as forming part of the relay switch controlling means, though other circuitry is involved which is also included in the relay switch controlling means.

In the embodiment shown in FIGURE 3, the configuration of FIGURE 2 has been changed to include a second switch for each relay unit connected across the first switch, which is operatively linked with and thus controlled by the energisation of the preceding relay unit. The first switch, that mentioned above, is still shown as switch $a_3$, $b_3$, etc. and is still effective to energise its relay, but in addition switches $n_{10}$, $a_{10}$, $b_{10}$ . . . $m_{10}$, etc. have been added as shown, connected across switch $a_3$, $b_3$, $c_3$, . . . $n_3$, etc. These as stated are controlled by the preceding relay unit so that switch $a_3$ has switch $n_{10}$ across it, $b_3$ has $a_{10}$ across it, and so on to $n_3$ with contacts $m_{10}$ across it. Switch $a_3$ has switch $n_{10}$ across it so that energisation of relay unit N will prime relay unit A for energisation, thus closing the relay unit chain upon itself and permitting repetion of the switching cycle.

Two control lines S and T are shown either of which may be grounded by the action of the changeover switch $w_1$, which in turn is caused to move between control lines S and T by the energisation state changes of a changeover relay in the operating mechanism W, though of course any other means for causing switch $w_1$ to change position could be used.

All of the relay units are connected at one end to lead V, which is connected to one pole of the source of power, shown here as the B+. The other end of alternate ones of the relay units shown here as relay units A, C . . . etc. are connected to one control line in this case line S, and the remaining ones, i.e. B, D . . . N, etc. are connected to the other control line, T.

The operation is as follows: Consider that switch $w_1$ is in that position where line S is grounded, and that relay unit A is energised due to switch $a_3$ being closed, $a_3$ being a normally open switch which is closed by the energisation of relay A. All the other relays are de-energised so that all the other subscript 3 switches $b_3$, $c_3$ . . . $n_3$, etc. which could energise their associated relay are open and will remain open till their associated relay is energised.

The only other way any of the other relay units could be energised would be if their normally open switch identified by subscript 10 was closed, and even then only relay units C, E . . . M, etc. could energise since only control line S is grounded. Of these subscript 10 switches only $a_{10}$ across $b_3$ is closed since only relay unit A is energised and relay unit B cannot energise since control line T is not grounded. Thus only switches $a_3$ and $a_{10}$ will be closed and only relay unit A will be energised.

Now let the operating mechanism W cause changeover switch $w_1$ to perform a switching operation, disconnecting line S from ground, and connecting instead line T to ground. Providing the subscript 10 switches are of the slow opening type, and this can be achieved by selection of a suitable relay type, line T will be grounded before switch $a_{10}$ has opened thus energising relay B and closing switch $b_3$ which thus maintains relay unit B in an energised condition after switch $a_{10}$, has opened.

Disconnecting line S from ground de-energises relay A opening switch $a_3$, leaving relay unit A de-energised, relay unit B energised, switches $b_3$ and $b_{10}$ closed, and all the other switches open.

The next operation of changeover switch $w_1$ will ground S again and disconnect T, energising relay C through switch $b_{10}$ and thus closing switch $c_3$. Relay B will de-energise, and the relay unit energisation sequence will have advanced one step. This process continues until relay unit N is energised thus completing one switching cycle. Switch $n_{10}$ is shown in the lead to relay unit A so that provided relay units A and N are connected to different control lines, the next switching operation will de-energise relay unit N and will energise relay unit A, thus starting the next switching cycle. Switching cycles will be repeated as long as switching operations are continued on switch $w_1$.

The system of FIGURE 3 has its drawbacks since it relies on slow opening switch contacts, which could hinder the high speed and uniform operation of the relay switching system. A more useful type of switching arrangement is shown in FIGURE 4.

As for the embodiments of FIGURES 2 and 3 described above it comprises the relay units A, B, C, D . . . N, etc., which are operated as before in a sequential manner by the alternate grounding of two control lines S and T. Now, however, each relay can be caused to operate by the energisation of two companion coils, the first of which is known as a transfer coil and is used to initiate the operation of the relay and the second of which is known as the hold coil and is used to maintain the relay in an energised condition. The transfer coils are denoted by the subscript $t$ and the hold coils are denoted by subscript $h$.

Figure 4:
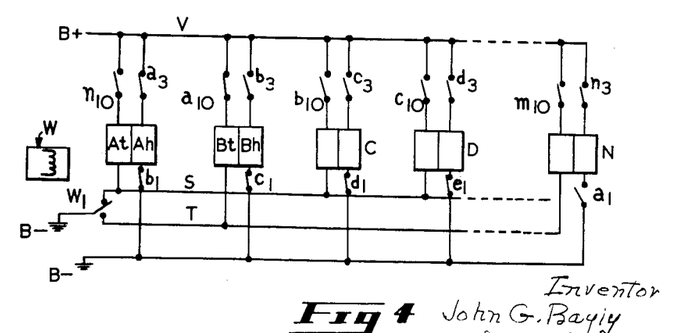
FIGURE 4 shows a more advanced form of sequentially operated self advancing relay chain.

Referring to FIGURE 4 it will be seen that each transfer coil $A_t$, $B_t$, etc. has in the connection to it from the B+ power supply line V a normally open switch denoted by the subscript 10.

As before these normally-open contacts in the lead to the transfer coil are associated with the preceding relay in the switching cycle sequence so that in the transfer coil circuit of relay B these normally open contacts are associated with relay A and are designated contacts $a_{10}$ similarly for relay C these are contacts $b_{10}$, etc.

Another normally-open switch denoted by subscript 3 controls the flow of current to the hold coil of the relay with which it is associated thus contacts $a_3$ are in the B+ lead to relay hold coil $A_h$ of relay unit A, switch $b_3$ is in the lead to the hold coil $B_h$ of relay unit B and so on.

Thus these two sets of switches those denoted by the subscript 10 and those denoted by the subscript 3 ensure that a relay cannot pull in or transfer until the preceding relay unit has energised and also that the hold coil cannot be energised until the relay has transferred.

The other side of each transfer coil is connected as in FIGURE 3 to one or the other control lines S or T alternate relays being connected in turn to alternate control lines. Thus coil $A_t$ is connected to control line S, coil $B_t$ to control line T, coil $C_t$ to control line S and so on. It will be obvious that the relays cannot transfer therefore unless the control line associated with their transfer coil is grounded.

In the other connection to the hold coil of each relay there is a normally-closed switch denoted by the subscript 1 which normally connect the hold coil to ground. The function of these switches denoted by the subscript 1 is to ensure that, when a relay transfers or pulls in, the preceding relay de-energises thus contacts $c_1$ in the hold coil circuit of relay B ensure that this hold coil de-energises when relay unit C transfers.

The two control lines S and T are connected as before to a single-pole double-throw switch $w_1$ which alternately connects them to ground in response to operation unit W which may conveniently incorporate in its output a relay which is alternately energised and de-energised thereby switching the contacts of $w_1$. The manner in which unit W functions will be described later in association with the control unit 2.

The manner in which the relay chain operates is as follows. Consider that relay unit A is energised and that all other relays are de-energised thus of the two sets of switches having subscripts 3 and 10 both of which are normally open only $a_3$ and $a_{10}$ are closed; and of the normally-closed switches having subscript 1 only $a_1$ is open. Relay unit B cannot transfer since control line T is not grounded.

Consider now that switch $w_1$ operates and control line S is ungrounded and control line T becomes grounded. Since switch $a_{10}$ is closed, transfer coil $B_t$ becomes energised, but no other relay can transfer since all of the other subscript 10 switches are open.

When coil $B_t$ energises, it closes switches $b_3$ and $b_{10}$ which energises hold coil $B_h$, but since line S is now ungrounded transfer coil $C_t$ cannot pull in through switch $b_{10}$ and so contact $c_1$ remains closed.

At the time relay unit B is energised, switch $b_1$, in the hold coil circuit of relay unit A, is opened thus de-energising relay A. This causes switches $a_3$ and $a_{10}$ to open de-energising transfer coil $B_t$ of relay B and hold coil $A_h$ of relay A and also closing contact $a_1$. Thus with the grounding of line T relay unit B has transferred and held and relay unit A has become de-energised.

If now control line S is again grounded transfer coil $C_t$ will be energised due to the fact that switch $b_{10}$ is closed. Relay C transfers closing switch $c_3$ and thereby energising hold coil $C_h$ of relay unit C. This causes switch $c_1$ in the hold coil circuit of relay unit B to open deenergising relay unit B and thus by the grounding of line T relay C has become energised and relay B has become de-energised. It will thus be appreciated that as the two control lines are alternately grounded, the relay energising sequence will pass along the chain of relays with succeeding relays becoming energised each time the control line ground is switched. This procedure carries on until relay N is reached.

Though shown here as being the last relay in the series, relay N is in fact the relay preceding relay A. That is the chain of relays closes upon itself so that grounding of the appropriate control line after relay N i.e. control line S will cause relay A to transfer and relay A thus becomes energised. Thus although shown as an elongated series of relays, the connections are such that the relay chain may be more appropriately considered as a closed loop.

It will be obvious that the function of the subscript 10 series of switches is to ensure that only the succeeding relay can be energised upon the next grounding operation; that of the subscript 3 series is to ensure that the relay holds and that of the subscript 1 series contacts is to de-energise the preceding relay upon the successful transfer of the following one.

Figure 5:
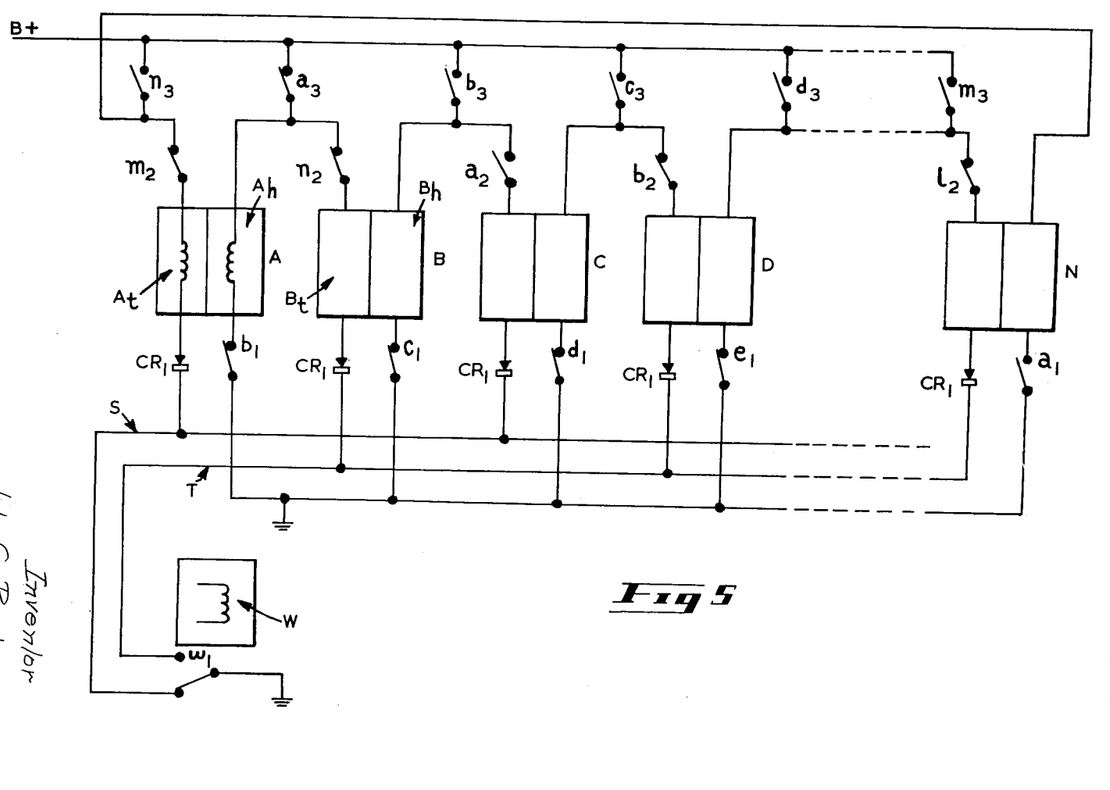
FIGURE 5 shows the preferred form of sequentially operated self advancing relay chain used in the present invention.

The preferred embodiment of the relay energisation system is shown in FIGURE 5. Basically it embodies the same operating principle and operates in the same manner as that shown in FIGURE 4, except for three changes.

The first two are relatively minor, one is that since respective pairs of switches having subscripts 3 and 10 shown in FIGURE 4 are associated with the same relay and perform the same function at the same time, they can be combined in one switch as shown in FIGURE 5, where the transfer coil of any relay and the hold coil of the preceding relay are connected to the B+ line V through a common switch having subscript 3; the other is that a diode $CR_1$ is connected in series with the transfer coil of each relay unit so as to prevent the spurious energisation and hence the "chattering" of the relay.

The final change is more significant and consists of the introduction into the transfer coil connection of each relay unit of a normally-closed switch which is operatively linked with and thus controlled by the energisation of the preceding relay unit but one in the switching cycle sequence. This set of switches is denoted by the subscript 2 in FIGURE 5.

The purpose of the subscript 2 set of switches is perhaps a little obscure since at first sight it would appear that their introduction is extraneous. The function of this series of contacts does not become apparent until the high speed operation of the relay chain is considered. It has been found that in high speed operation it is possible for two adjacent relays connected to the same control line e.g. relays A and C, to energise at the same time when their common control line is grounded, even though the earlier relay should have de-energised by this time. This is due to the finite operating time of the contacts and the time required for the magnetic field in the relay to decay. To prevent this the subscript 2 switches are included to ensure that this earlier relay on the same control line must have de-energised before the later relay can energise. Thus in the transfer coil circuit of relay C there is included switch $a_2$ which will only close when relay unit A has de-energised so that relay C cannot transfer until relay A has de-energised. It should be emphasized that this danger of double operation at high speed is a real one and that the provision of these contacts is a necessary adjunct to the high speed operation of the system though of course low speed operation without them is possible.

Though the relay units are shown here in one extended series it should be appreciated that the series can be quite readily interrupted at any specific point and a number of smaller units formed each of which can be readily associated with the simulation of a separate distinct time delay though of course the switching rate would still be governed by the rate of switching the ground from line S to line T, though here also provision can be made for interrupting these two control lines and connecting them to different control units 2. Also more than two control lines could be used provided that the grounding or changeover switch advances to each control line in the same repeated sequence and the relay units are connected in groups to the control lines in the same sequence.

Figure 6:
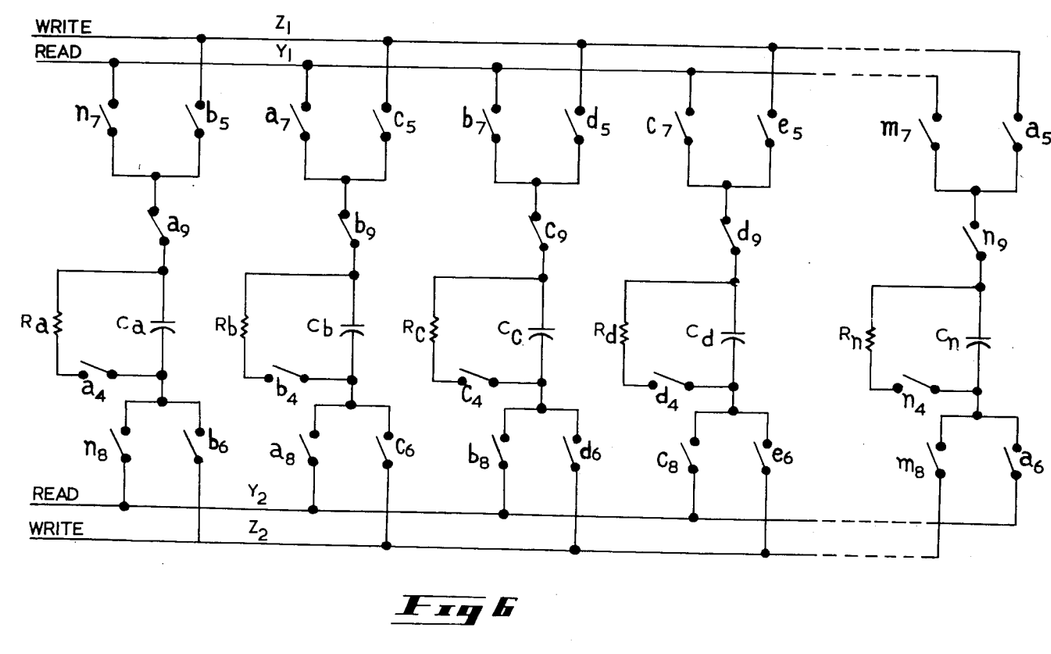
FIGURE 6 is a schematic diagram of the circuitry associated with the condenser chain whereby each condenser is connected in sequence to the reading and writing circuits.

The condenser unit associated with the relay unit of FIGURES 2, 3, 4 and 5 is shown in FIGURE 6. It will be noted that there is an extended series of condensers, one associated with each relay, the association being denoted by a similar subscript thus condenser $C_a$ is associated with relay A, $C_b$ with relay B and so on down to relay condenser $C_n$ which is associated with relay N. Each condenser is capable of being connected by a normally open switch across either of two sets of lines, one of these being the write lines $Z_1$, $Z_2$ and the others being the read lines $Y_1$, $Y_2$.

As shown here each condenser is connected in turn sequentially to the write lines $Z_1$, $Z_2$ of the donor circuit by the energising of the relay following that associated with the condenser, this being accomplished by the closure of two normally-open switches with two switches being prefered for their improved isolation though one switch alone could be used. These switches are identified in FIGURE 6 by subscripts 5 and 6 so that again for the example of condenser $C_b$ this condenser is connected to the write lines by the energisation of relay unit C closing switches $c_5$ and $c_6$.

Similarly each condenser can be connected across the read lines $Y_1$, $Y_2$ of the acceptor circuit by two normally open switches which as shown are associated with the relay preceding the one associated with the particular capacitor. These switches are shown in FIGURE 6 as having subscripts 7 and 8 in each case. Thus for example condenser $C_b$ associated with relay unit B is connected to the read lines by contacts $a_7$ and $a_8$ which are closed when relay unit A is energised.

When the respective relay associated with the condenser is energised, both of the two sets of switches which enable the condenser to be connected to either the read or write lines are open and the condenser is isolated. The switches with subscript 4 are provided so that the condenser may be discharged after its voltage has been connected to the read lines and before it is again connected to the write lines. The switches with subscript 9 are needed during the transition from one relay to the next since for a short time, namely, the time after the newly energised relay has operated but the previous relay has not de-energised, two succeeding relays are energised.

Energising the associated relay also causes a switch to close which places a resistor or similar discharge device across the isolated condenser thus erasing the charge on this condenser. This resistor is denoted in FIGURE 6 by the appropriate subscript of the associated relay so that capacitor $C_b$ associated with relay unit B has its charge erased by the connection across it of resistor $R_b$ which is brought into circuit by the closing of normally-open switch $b_4$ upon the energisation of the relay unit B. Similar switches having subscript 4 after them perform the same function for the other condensers.

The pattern of events is by now obvious. Energising each relay does three things, it causes the condenser associated with the relay to have its charge erased, it causes the condenser associated with the preceding relay in the switching cycle sequence to be connected to the write circuit and the condenser associated with the subsequent relay in the switching cycle sequence to be connected to the read circuit. Thus as the relays are sequentially energised each capacitor is connected first to the read circuit then its charge is erased and then it is connected to the write circuit.

This is best understood by considering the example of a specific condenser, say condenser $C_b$. When relay unit A energises condenser $C_b$ has its associated normally open swithces $a_7$ and $a_8$ closed so that it is connected across the reading circuit and the discharging voltage on the condenser is read out. The next switching operation causes the relay unit A to de-energise and relay unit B to energise condenser switches $a_7$ and $a_8$ open, since switches $c_5$ and $c_6$ are already open due to the fact the relay unit C is not energised condenser $C_b$ is isolated from the read and write circuits. Switch $b_9$ opens and switch $b_4$ closes due to relay unit B being energised so that $C_b$ has resistor $R_b$ connected across it and its charge is erased. The next switching operation causes relay unit B to de-energise and relay unit C to energise which in turn cause switches $c_5$ and $c_6$ to close, switch $b_9$ to close and switch $b_4$ to open so that condenser $C_b$ is disconnected from $R_b$ and is connected to the writing circuit and accepts a charging voltage from this circuit. The next operation is that relay unit D energises which means that switches $c_5$ and $c_6$ open so that condenser $C_b$ is isolated from the reading and writing circuits and will remain in this condition until the relay switching cycle sequence is completed and relay A is again energised.

Thus it will be seen that for each condenser the operation performed by sequential relay energisation steps are read, erase, write after which there is a delay until the sequence is repeated so that in between the writing operation and the reading operation there is a delay corresponding to the time taken for the relay energisation sequence to be repeated and this, it will be observed is equal in the present case to N—2, the number of relays minus two, multiplied by the time for each relay switching operation, due to the fact that the reading and writing operations are separated by two relay operations, and N of course is used in the general sense and denotes the number of relays associated with any particular switching cycle sequence.

As shown in FIGURE 6 and described above the condenser switches and their respective relay units are arranged so that the maximum delay is obtained, i.e. N−2 times the time required for the switching operation. The delay can obviously be shortened by reducing the time for each switching operation and this, as described below is the preferred method of control. However, the delay can also be shortened by spacing the reading and writing operations further apart in the switching cycle sequence, by selecting different respective relay units for the condenser switches. For example, in the case of condenser $C_b$ above the read switches could remain associated with relay unit A, and the erase switches with relay unit B, but the writing switches could be associated with a later relay unit than relay unit C, say relay unit F, which would in effect mean replacing switches $c_5$ and $c_6$ in FIGURE 6 with switches $f_5$ and $f_6$, and so the reading and writing operations on condenser $C_b$ would be spaced by five switching operations, i.e. the total delay would be N−5 times the switching operation period.

Of course all the writing switches would have to be altered in a similar fashion, but it will be obvious that the basic requirement is that every condenser unit must be connected in a given sequence to the donor or writing circuit and some time thereafter, dependent on the number of switching operations separating the two steps, to the acceptor or reading circuit.

Though erasure is shown here as a distinct separate step, it can in fact be combined with either the reading or the writing operation, by providing some means in the information circuit whereby some electrical discharge device, preferably a low impedance component, is connected across the condenser, either at the end of the reading operation or at the beginning of the writing operation. The basic requirement is that after or during the reading operation the electrical voltage charge on the condenser be erased or at least appreciably reduced, and that this reduction be effected before the writing operation.

The above paper by Dandl and Stone of the Oak Ridge Laboratory shows a reading and writing circuit for incorporation in the information unit 5 which may be used in conjunction with the circuit described in FIGURE 6 and this circuit has the virtue that only a single amplifier need be used for both reading and writing operations. This circuit does not require that the condensers be isolated from one another completely during the reading and writing operation, but if they do have a common connection only one condenser can be read at a time.

One circuit which has been used in practice with the condenser unit series of FIGURE 6 used two amplifiers, one for the reading operation and one for the writing operation. Since the condensers in the chain are isolated from one another the output can be of the same sign as the input or may if desired be of the opposite sign, i.e. polarity. Furthermore because of this isolation, it is possible to read out at several points in the delay by the simple introduction of further condenser switches introduced into the reading and writing circuit lines so that the same series of condenser units may be used to simulate several different delays at any one time.

As stated above, the switching speed of the change over switch $w_1$ of FIGURES 3-5 directly influences the delay time being simulated and so it is desirable that ready means be incorporated in the time delay device for controlling this switching speed, and this of course is most conveniently done by having a relay which controls switch $w_1$ alternately energise and de-energise. In FIGURES 3-5 this operating mechanism for controlling the switching speed of changeover switch $w_1$ was simply shown as a block W whose output included the changeover relay. Block W may take a variety of forms suitable for switching purposes and could for example be a simple free running astable multivibrator of the type described in volume 19 of the Mass. Institute of Technology Radiation Laboratory Series where the symmetrical pulse output from such a multivibrator could be used to control the operation of the changeover relay and also the period of the multivibrator readily lends itself to control by means of suitable variable circuit components so that the switching speed may be regulated by simple control means such as a variable potentiometer.

Figure 7:
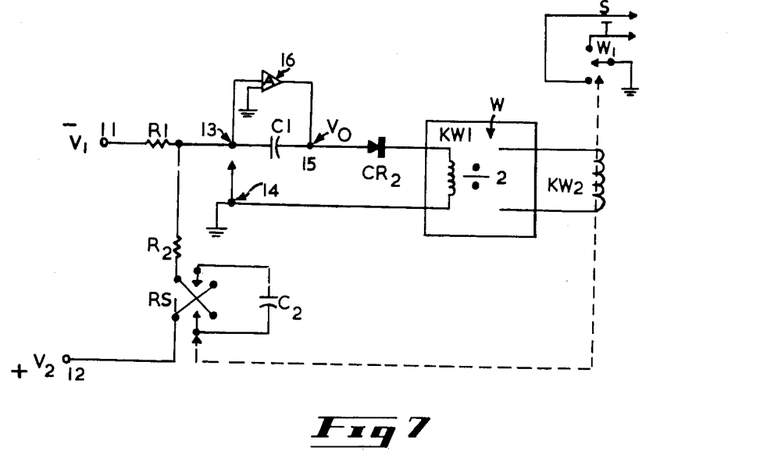
FIGURE 7 shows a control circuit which is used to regulate the speed at which the relay chain operates.

However, in the present apparatus, a circuit has been devised in which the switching speed may be controlled by varying either of two D.C. potentials which may then be usefully arranged to correspond to the transport velocity and transport distance of the delay being simulated and this circuit is shown in FIGURE 7.

Here the changeover relay which controls the operation of changeover switch $w_1$ which in turn alternately grounds the two control lines S and T is the output relay KW2 of a block mechanism W. The input to this block, which performs the function of a divide-by-two circuit is shown as relay KW1 and it will be obvious that the arrival of one pulse at relay KW1 is required to switch the output relay from one state to another. This may be done for example by having the input pulses change the state of a bistable multivibrator or "flip-flop" so that the output relay KW2 changes its state, and indeed with such a circuit it is possible that the output pulses could be applied directly to the control lines S and T though of course in this case a potential would then appear on these lines and in order to usefully employ this potential to control the operation of the transfer coil of each relay it would be appropriate to move the B+ potential from the far side of each transfer coil and connect it instead to ground as well as reversing the polarity of the relay coils. However, as shown here, all that is required of block W is that it be a divide-by-two circuit. A preferred form of this circuit will be described later in connection with FIGURE 9.

An extremely useful circuit for controlling the operation of the input relay of block W is that shown in FIGURE 7. Here a first source of constant potential $V_1$ is applied to input connection 11 and is then connected via a first charging resistor $R_1$ and a first charging capacitor $C_1$ respectivley in series to one side of the coil of KW1, the input relay of block W. Into the lead between the capacitor $C_1$ and the coil of relay KW1 there is introduced a diode $CR_2$ which ensures that the relay can only operate when the potential of junction 15 between the capacitor and the rectifier is at a positive potential with respect to ground, as for negative potentials this diode has a very high impedance. Across the capacitor $C_1$, from the junction 13 between the resistor $R_1$ and the capacitor to the junction 15 mentioned above, there is connected a high gain amplifier 16 which has a high input impedance and a low output impedance with respect to ground. The other side of the relay coil of relay KW1 is connected to ground.

The operation of the circuit thus far described is that in the absence of any voltage in input connection 11 the junction 13 is substantially at ground potential. The appearance of a potential of either polarity at input connection 11 tends to raise the potential of junction 13. However, due to the presence of the high gain amplifier 16, any slight change in the potential of junction 13 is immediately reflected as very substantial change in a potential of junction 15 but of the opposite polarity. The effect is that the junction 13 stays substantially at ground potential and this means of course that current flows at a constant rate into this junction due to the fixed potential across the resistor $R_1$ which thus governs the current flow into the junction 13. Since this junction stays at substantially constant potential it follows that the current flow into this junction must equal the current flow out of it so that this current must flow through capacitor $C_1$ at a fixed rate also corresponding to that through resistor $R_1$, for the amplifier input connection which is also connected to the junction has but little effect on the current flowing in and out of it due to the very high input impedance of this amplifier.

A constant current flow through capacitor $C_1$ means of course that potential builds up across this capacitor at a linear rate and so that the appearance of a steady voltage $V_1$ at input connection 11 is reflected at junction 15 as a steady linear with time increase in the potential of junction 15 but of the opposite polarity. With the connection as shown for $CR_2$ a negative potential $V_1$ appearing at input connection 11 is reflected as a positive linear with time increase in potential of junction 15 so that $V_0$ has a linear rate of increase with time and when this potential reaches a sufficiently high value with respect to ground relay KW1 will operate.

An essential feature of this circuit is of course the fact that junction 13 is held substantially at a close to ground potential, and this has been indicated by the presence of arrow 14 from the ground line to this junction which shows that this potential is held substantially at ground. For a more detailed exposition of this circuit and the manner in which it functions, reference may be had to volume 19 of the MIT Radiation Laboratory Series at sections 2.5 and 2.6.

In practical use the potential applied to input connection 11 is kept constant and this of course would normally mean that the potential $V_0$ of junction 15 would keep on rising and the relay would remain constantly energised. However, additional circuitry is included which periodically rapidly lowers the potential of junction 15 which then repeats the charging cycle. At the time of the rapid lowering of the potential $V_0$ the relay is de-energised and then the potential at this point again rises slowly in the manner described above.

The circuitry to accomplish this rapid lowering in potential $V_0$ comprises a second charging resistor $R_2$ which is connected to the junction 13 between resistor $R_1$ and capacitor $C_1$, this resistor $R_2$ being connected in series by a double pole reversing switch $RS_1$ to a second charging capacitor $C_2$ and thence to a second input connection 12 to which is applied a second potential $V_2$ of opposite polarity to that applied to input connection 11 for $V_1$. The manner in which this circuit functions is that as potential $V_0$ is rising, capacitor $C_2$ charges very rapidly substantially to potential $V_2$ and is charged with respect to junction 13 in the same sense as is junction 15. When the potential $V_0$ reaches the prescribed operating potential as described above, input relay KW1 operates and in turn causes changeover relay KW2 to change its energisation state. Relay KW2 in addition to controlling switch $w_1$ also reverses switch $RS_1$ so that the capacitor $C_2$ is now connected in this circuit with its stored potential opposite in polarity to that of the input voltage to it, $V_2$, and immediately begins to charge up in the opposite direction. Since this capacitor previously had a charge equal to $C_2$, $V_2$ on it in one sense, and must now lose this charge before acquiring a similar charge again in the opposite sense the total change in charge on this capacitor is equal to $2C_2V_2$, this charge must flow into the capacitor $C_2$ from the junction 13. Since this junction is clamped substantially at ground potential and the current flow across $R_1$ is effectively fixed due to the nature and presence of potential $V_1$ it follows that the charging current for capacitor $C_2$ must substantially all flow through condenser $C_1$. The value of $R_2$ is chosen in relation to $R_1$ and potential $V_1$ and $V_2$ so that the reversed charging of capacitor $C_2$ takes place at high speed and the build up of potential across this capacitor is thus very rapid. The corresponding current flow through capacitor $C_1$ is therefore very rapid and this rapid current flow causes the potential $V_0$ to drop very suddenly to a low potential in the opposite sense to that at which it was previously aiming through the charging circuit of $R_1$.

Figure 8:
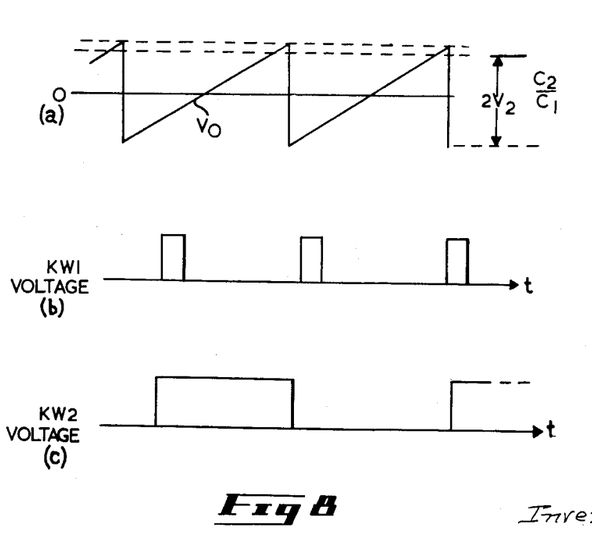
FIGURE 8 shows the three principal wave forms of the circuit of FIGURE 7.

This is shown graphically in FIGURE 8 where FIGURE 8a shows the sawtooth wave form for potential $V_0$ which controls the operation of relay coil KW1. During the linear buildup portion of this curve the potential $V_0$ is climbing as described above in response to the charging current through resistor $R_1$. When the voltage $V_0$ passes the zero reference or ground potential line and reaches a certain positive potential with respect to ground it causes the coil of input relay KW1 to energise thus operating the changeover relay KW2 which in turn operates the reversing switch $RS_1$ and causes the above mentioned rapid fall in the potential of junction 15 thus lowering the potential $V_0$ with extreme rapidity.

The change in charge of capacitor $C_2$ is as stated above $2C_2V_2$ and this charge must flow through capacitor $C_1$ inducing in that capacitor a voltage drop corresponding to the charge divided by the capacitance, i.e.

$$\frac{2V_2C_2}{C_1}$$

as shown in FIGURE 8a. The rate of increase of potential $V_0$ with time is governed by $V_1$, $C_1$ and $R_1$. It can be shown that the slope of this line is given by $$\frac{V_1}{C_1R_1}$$

(see MIT reference above) and since the total change in potential is shown to be $$\frac{2V_2C_2}{C_1}$$

it follows that the charging time between operations of relay KW1 is proportional to $$\frac{2C_2V_2}{C_1} \div \frac{V_1}{C_1R_1} = 2C_2R_1\frac{V_2}{V_1}$$

and the frequency or switching rate is of course inversely proportional to this so that the frequency may be put as $$f_r \alpha \frac{V_1}{V_2} \frac{1}{2R_1C_2}$$

which means that the switching rate is substantially independent of the value of capacitor $C_1$.

Relay KW1 operating voltage is shown in FIGURE 8b and consists of a series of short energisation pulses starting with the arrival of a voltage $V_0$ at operating potential and terminating at some time after this voltage has dropped rapidly below the operating potential, this time being governed by the holding time of the relay which is generally of finite length.

As stated above it is required that each time the input relay KW1 operates then the changeover relay KW2 must change its state in the manner illustrated in FIGURE 8c. For each operation of relay KW1, KW2 voltage changes between an energisation level and substantially ground potential.

Figure 9:
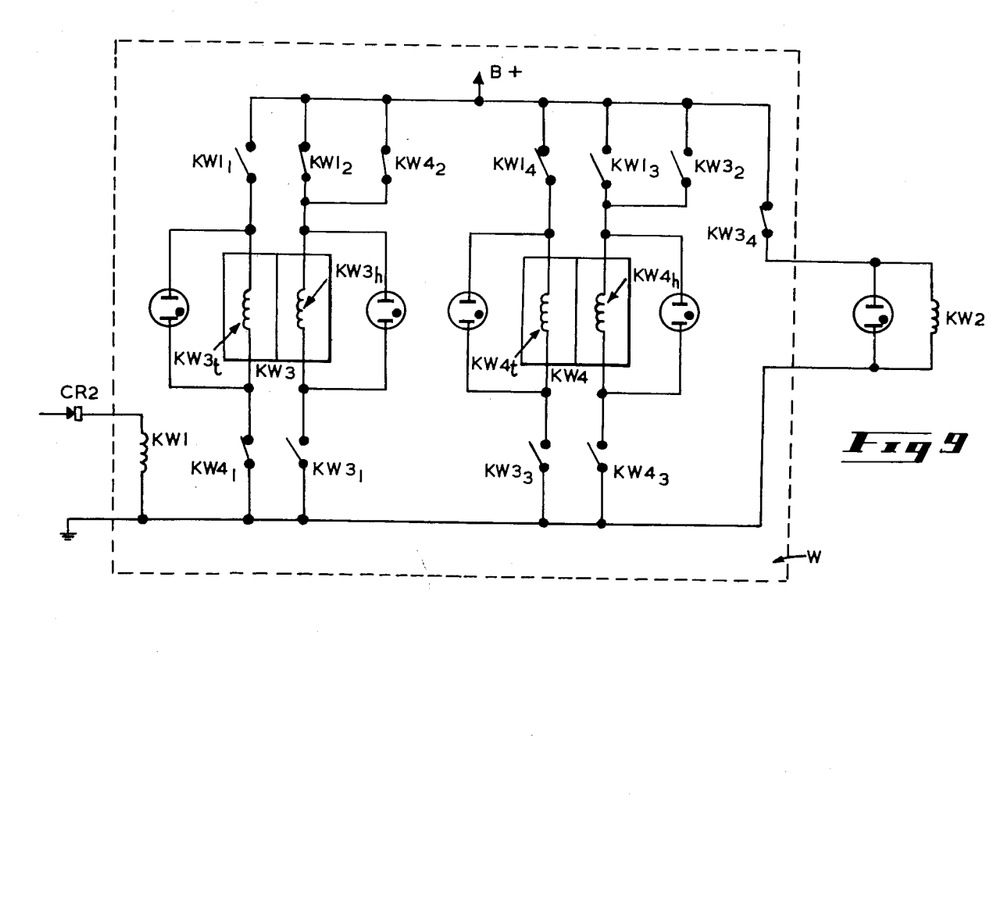
FIGURE 9 shows a detail of a specific divide-by-two switching circuit which may be employed with the control unit of FIGURE 7.

One preferred divide-by-two circuit for the block W is shown in FIGURE 9 though as stated above, other circuit arrangements may be employed. As shown here the circuit consists in essence of two switching relays KW3 and KW4 which by an appropriate switching sequence are caused to change their state each time input relay KW1 operates and one of these relays, here shown as relay KW3, controls the operation of the changeover relay KW2. Each of these relays in the manner described above has a transfer coil and a hold coil. The transfer coil of relay KW3 is connected between the two power lines, one of which is grounded and the other of which is connected to the B+ supply, in series with two switches one of which $KW1_1$ is normally open and is only closed when relay KW1 is energised, and the other of which $KW4_1$ is normally closed and only opens when KW4 is energised. Thus relay KW3 can only transfer when relay KW4 is de-energised and relay KW1 is energised. The hold coil $KW3_h$ of relay KW3 is also connected between the power lines and contains on one side a normally open switch $KW3_1$ which is only closed when the transfer coil $KW3_t$ is energised. Also in series with this hold coil are connected in parallel two normally-closed switches $KW1_2$ and $KW4_2$ whose presence means that KW3 can only hold when either relay KW1 or relay KW4 is de-energised.

Relay KW4 has similar connections. In the transfer coil connection to transfer coil $KW4_t$ of KW4, there are two switches one of which is normally closed and the other of which is normally open. The normally-closed switch is $KW1_4$ and the normally-open switch $KW3_3$ so that relay KW4 can only transfer when relay KW1 is de-energised and relay KW3 is energised. The hold coil circuit of relay KW4 contains the normally open switch $KW4_3$ which closes only when relay KW4 transfers. In the other connection to relay KW4 hold coil is connected in parallel normally open switches $KW1_3$ and $KW3_2$ which only close when relays KW1 or KW3 are energised so that relay KW4 can only hold when relay KW1 or KW3 is energised.

The control switch for the supply of current for operating changeover relay KW2 operating coil are contacts $KW3_4$ which are normally closed so that KW2 is energised when KW3 is de-energised and de-energises when relay KW3 is energised.

In considering the operation of this circuit it is expedient to start from that point where both relays KW3 and KW4 are de-energised as is relay KW1. In this state of course relay switch $KW3_4$ is closed and so relay KW2 is energised.

Now imagine that a pulse is applied to KW1 thus energising this relay. This causes relay $KW1_1$ to close and since switch $KW4_1$ is already closed, transfer coil $KW3_t$ of relay KW3 thus transfers closing switch $KW3_1$. Switch $KW1_2$ has been opened by the arrival of the operating pulse relay KW1, but switch $KW4_2$ is still closed due to the fact that KW4 is not energised and so relay KW3 will hold. Since switch $KW1_4$ in the transfer coil circuit relay KW4 is open due to the energisation of relay KW1 relay KW4 cannot transfer and so this relay remains de-energised.

The next event is that relay KW1 de-energises, this causes switch $KW1_1$ to open de-energising the transfer coil of relay KW3 and closing switch $KW1_2$ so that now both switches $KW1_2$ and $KW4_2$ are closed and so relay KW3 continues to hold. With the de-energisation of relay KW1 switch $KW1_4$ closes again and since relay KW3 is energised, switch $KW3_3$ is also closed so that the transfer coil $KW4_t$ of relay KW4 becomes energised and relay KW4 transfers. This in turn closes switch $KW4_3$ and since switch $KW3_2$ is closed due to the energisation of relay KW3 the circuit to the hold coil $KW4_h$ of KW4 is complete and this relay holds also.

Thus the arrival and departure of an operating pulse at relay KW1 has caused both relays KW3 and KW4 to become energised and with the energisation of relay KW3 there has been an opening of switch $KW3_4$ so that relay KW2 is now de-energised.

The next event is that relay KW1 again energises. Switch $KW1_1$ closes but due to the energisation of relay KW4, switch $KW4_1$ is open so that the transfer coil of KW3 cannot energise. Since switch $KW4_2$ is open due to the energisation of relay KW4, relay hold coil $KW3_h$ is only energised through switch $KW1_2$ which is normally closed but with the arrival of the operating pulse at relay coil KW1 is caused to open thus de-energising hold coil $KW3_h$ so that relay KW3 then de-energises.

With the de-energisation of KW3 contacts $KW3_3$ open deenergising the transfer coil $KW4_t$ of relay $KW4_1$, however, relay hold coil $KW4_h$ will remain energised due to the fact that switches $KW1_3$ and $KW4_3$ are still closed, though switch $KW3_2$ has now opened due to the deenergisation of relay KW3. The next event is again the de-energisation of relay KW1 switch $KW1_1$ then opens so that relay KW3 cannot energise upon this event, and this in turn means that the transfer coil of relay KW4 cannot energise and since the de-energisation of relay KW1 means that switch $KW1_3$ in the hold coil circuit of relay KW4 now opens, the hold coil circuit to relay KW4 is broken and this relay becomes deenergised.

Thus the second energisation of relay KW1 has caused a reversal to the original state with both relays de-energised and this of course means that switch $KW3_4$ now closes again and KW2 becomes energised thus fulfilling the required conditions that succeeding pulses arriving at the relay coil KW1 cause a reversal in the state of changeover relays KW2. The changes in the energisation state of KW2 cause changeover switch $w_1$ to connect control lines S and T alternately to ground, this in turn causes the switching cycle energisation sequence of the relay units to advance and reading and writing sequences are performed on the condenser units.

The above description has been concerned with one particular embodiment, but as mentioned above various other arrangements, and substitution of certain other circuits, can be made without departing from the spirit of the present invention, so that the scope of the time delay device is not to be limited by this specific description but rather is to be constructed from the breadth of the following claims.

The embodiments of the invention in which an exclusive property or privilege is claimed are defined as follows:

1. An analogue time delay device comprising a source of electric power; a plurality of relay units for energization upon connection to said source of power, means for altering the energization state of each of said relay units in continuous sequence whilst maintaining all except one of said units in the same energization state as one another, a plurality of electrical condenser units; a donor circuit connectible to each condenser unit and operatively arranged to donate information thereto in the form of a change of electrical charge; an acceptor circuit separately connectible to each condenser unit and operatively arranged to accept information therefrom in dependence upon the charge on the condenser unit, a plurality of first switches for connecting each said condenser unit to said donor circuit and a plurality of second switches for connecting each said condenser unit to said acceptor circuit; each of said first and second condenser switches being operatively controlled by the energization state of a respective one of said relay units, whereby said sequential operation of said relay units in a switching cycle is effective to cause each condenser unit to be connected in a predetermined sequence to said donor circuit and thereafter in the same sequence to said acceptor circuit.

2. A time delay device according to claim 1 wherein said condenser unit further comprises, a third relay-controlled condenser switch for connecting electrical discharge means to said condenser in such a manner as to discharge said condenser once during each switching cycle intermediate its connection to said acceptor circuit and said donor circuit.

3. A time delay device according to claim 1 wherein said source of power is bipolar and each said relay unit comprises an electrical relay further comprising, a first relay switch connected in series therewith, operatively controlled by the energisation state of the relay of the preceding relay unit in said switching cycle sequence, and a second relay switch connected across said first relay switch operatively controlled by the energisation state of the relay of the said relay unit; and wherein the means for altering the energization state of each of the relay units in sequence comprises a first control line, a second control line, and a two position changeover switch effective in first position to connect said first control line to one pole of said source and in second position to connect said second control line to said one pole of said source; and yet further comprising means connecting alternate ones of said relay units between said first control line and the other pole of said source, means connecting the remaining ones of said relay units between said second control line and said other pole of said source; and means for causing said changeover switch to undergo repetitive switching operations between said first position and said second position.

4. A time delay device according to claim 1 wherein said source of electric power is bipolar and each said relay unit comprises an electric relay having a transfer coil and a holding coil; further comprising, a first relay switch connected in series with said transfer coil operatively controlled by the energisation state of the relay of the preceding relay unit in said switching cycle sequence, a second relay switch connected in series with said holding coil operatively controlled by the energisation state of the said relay unit, and a third relay switch also connected in series with said holding coil, operatively controlled by the energisation state of the relay of the succeeding relay unit in said switching cycle sequence; and wherein said means for altering the energizing state of each of the relay units in sequence comprises, a first control line, a second control line, and a two position changeover switch effective in a first position to connect said first control line to one pole of said source and in a second position to connect said second control line to said one pole of said source; said transfer coil and said first relay switch of alternate relay units being connected in series between said first control line and the other pole of said source, said transfer coil and said first relay switch of the remaining relay units being connected in series between said second control line and said other pole of said source, said holding coil and said second and third relay switches of all of said relay units being connected in series between the two poles of said source; and said operating means comprises menas for causing said changeover switch to undergo repetitive switching operations between said first position and said second position.

5. A time delay device according to claim 4 wherein the functions of said first relay switch of the said relay unit and said second relay switch of the said preceding relay unit are performed by the same switch.

6. A time delay device according to claim 5 wherein said relay unit further includes a fourth relay switch connected in series with said transfer coil and said first relay switch operatively controlled by the energisation state of the preceding relay unit but one in said switching cycle sequence, said fourth relay switch being effective to prevent the transfer of the said relay unit until said preceding relay unit but one has changed its energisation state.

7. A time delay device according to claim 3 wherein said changeover switch operating means comprises an electric changeover relay operative as to cause said changeover switch to assume said first position when said changeover relay is in a first energisation state and said second position when said changeover relay is in a second energisation state, and means for cyclically changing the energization state of said changeover relay.

8. A time delay device according to claim 3, wherein said changeover switch operating means comprises an electric changeover relay operative as to cause said changeover switch to assume said first position when said changeover relay is in a first energization state and said second position when said changeover relay is in a second energisation state; a source of power for said changeover relay; a switching circuit connected to said changeover relay and to said source of power therefor arranged to cyclically change the energisation of said changeover relay between said first and second states in response to control pulses applied to the input of said switching circuit; and a control pulse generating circuit connected to the input of said switching circuit, said pulse generating circuit comprising a first source of electric potential, a first charging resistor and a first charging capacitor connected respectively in series between said first potential source and the input to said switching circuit; a high gain amplifier connected across said first charging capacitor whereby to maintain the junction of said first charging resistor and said first charging capacitor at substantially constant potential, a second source of electric potential of opposite polarity to said first source, a second charging capacitor and a second charging resistor connected respectively in series between said second source of electric potential and said junction of said first charging resistor and said first charging capacitor, a reversing switch connected to said second charging capacitor for reversing its connection to said second charging resistor and operatively linked with said changeover relay whereby a change in the energisation state of said changeover relay is effective to reverse said reversing switch.

9. A time delay device according to claim 8 wherein said switching circuit comprises an input relay connected to said control pulse generating circuit, a switching relay unit source of power, a pair of switching relay units connected to said source of power, each switching relay unit comprising, an electric switching relay having a transfer coil and a holding coil, first and second switching relay switches connected in series with said switching relay transfer coil, said first switching relay switch being operatively controlled by the energisation state of said input relay and said second switching relay switch being operatively controlled by the energisation state of the other of said pair of switching relay units, third and fourth switching relay switches connected in series with said switching relay holding coil, said third switching relay switch being operatively controlled by the energisation state of said input relay and said fourth switching relay switch being operatively controlled by the energisation state of one of the said switching relay units and a fifth switching relay switch connected across said fourth switching relay switch operatively controlled by the energisation state of the other of said pair of switching relay units; and a changeover relay switch connected in series with said changeover relay and said source of power for said changeover relay operatively controlled by the energisation state of one of said pair of switching relay units.

References Cited in the file of this patent
UNITED STATES PATENTS

| 2,789,256 | Stenerson | Apr. 16, 1957 |
| 2,823,368 | Avery | Feb. 11, 1958 |
| 2,823,369 | Haug et al. | Feb. 11, 1958 |
| 2,966,641 | McCoy | Dec. 27, 1960 |